United States Patent [19]

Wachs et al.

[11] 4,411,178
[45] Oct. 25, 1983

[54] PIPE END PREPARATION MACHINE

[75] Inventors: Edward H. Wachs, Lake Forest; Horst Kwech, Lake Bluff, both of Ill.

[73] Assignee: Power Cutting Incorporated, Lake Bluff, Ill.

[21] Appl. No.: 270,409

[22] Filed: Jun. 4, 1981

[51] Int. Cl.³ ............................................. B23B 3/24
[52] U.S. Cl. .................................... 82/4 C; 82/4 R; 82/2 E
[58] Field of Search .................. 82/4 R, 4 C, 2 E, 15, 82/28 R; 409/191

[56] References Cited

U.S. PATENT DOCUMENTS

| | | | |
|---|---|---|---|
| 2,486,977 | 11/1949 | Peters | 82/2 E |
| 3,273,432 | 9/1966 | Hasund | 82/4 R |
| 3,822,618 | 7/1974 | Tomenceak | 408/54 |
| 3,835,738 | 9/1974 | Kellum et al. | 82/4 C |
| 3,951,018 | 4/1976 | Gilmore | 82/4 C |
| 4,050,836 | 9/1977 | Anders | 82/4 C |
| 4,130,034 | 12/1978 | Benoit | 82/4 C |
| 4,161,127 | 7/1979 | Tiffin | 82/4 R |

FOREIGN PATENT DOCUMENTS 2734126  2/1979  Fed. Rep. of Germany ........ 82/2 E

OTHER PUBLICATIONS

Page 2 from a brochure of Power Cutting Inc.

*Primary Examiner*—Leonidas Vlachos
*Assistant Examiner*—Jerry Kearns
*Attorney, Agent, or Firm*—Wood, Dalton, Phillips, Mason & Rowe

[57] ABSTRACT

A pipe end preparation machine having a frame supportable in oriented relation from and beyond an end of a pipe, a tool head mounted on the frame for rotation about an axis, a tool slide mounted on the tool head for carrying a tool for movement along a path radial to said axis, a drive mechanism including a remotely controllable motor for advancing said frame toward the pipe end to provide axial feed for the tool, and drive mechanism for advancing said tool slide to provide radial feed for the tool including a remotely controlled motor which can be controlled to vary the radial feed rate in a continuous controlled manner. The remotely controllable motors for radial and axial feed of the tool permit threading, facing, and turning operations as well as other operations wherein circular interpolation effectively provides a third tool axis of movement as provided by the two axes of movement derived from the radial and axial feed.

5 Claims, 3 Drawing Figures

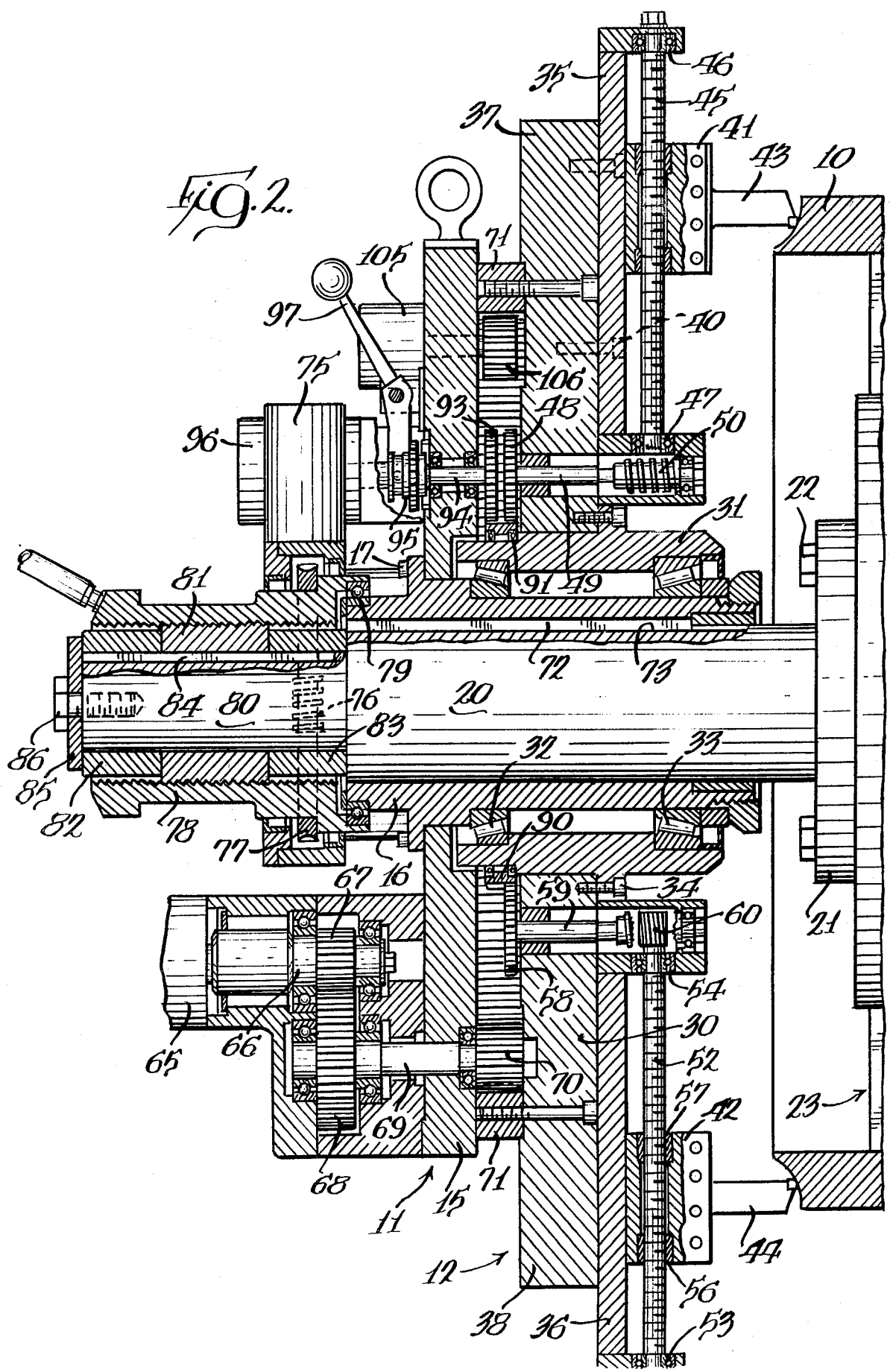

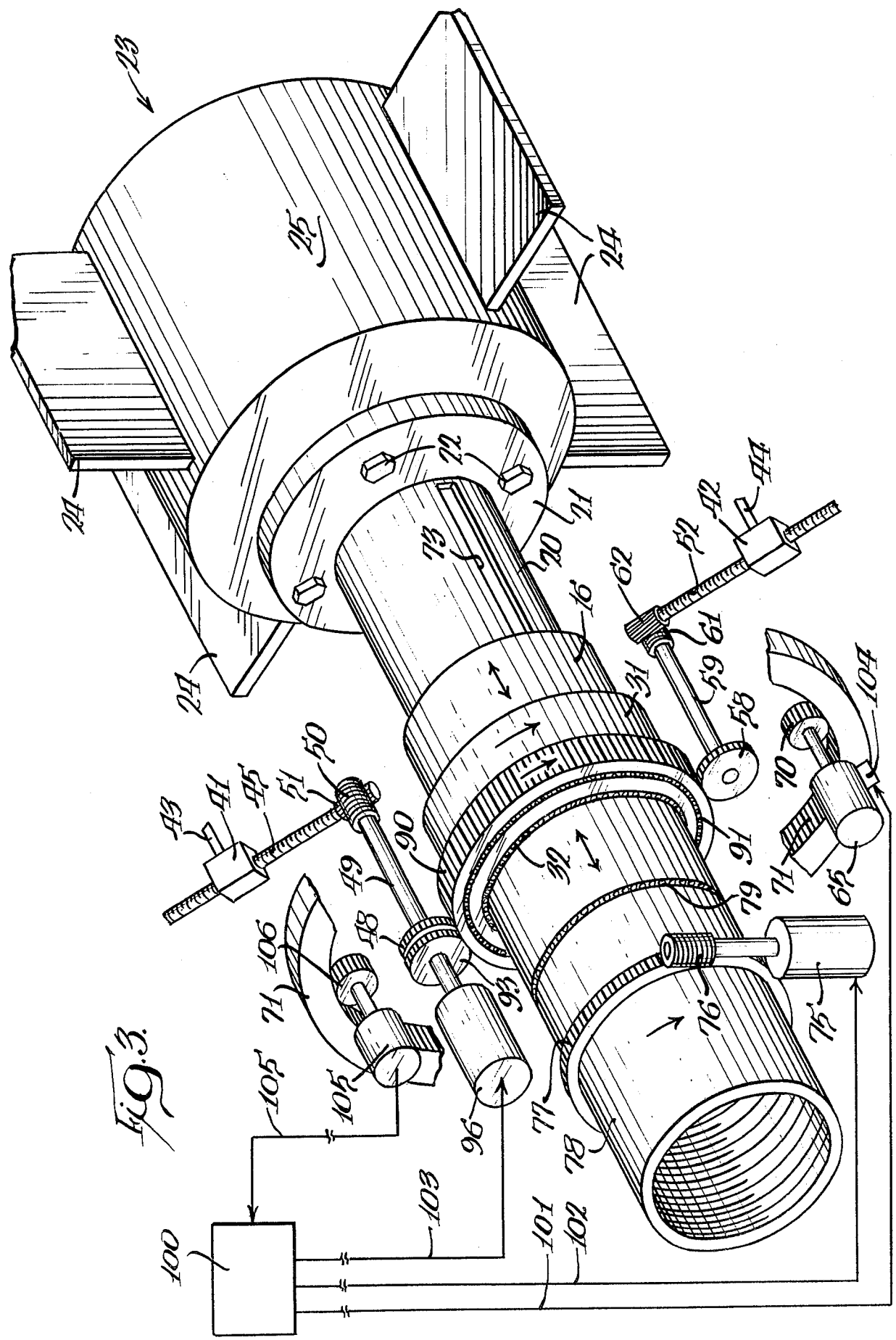

PIPE END PREPARATION MACHINE

BACKGROUND OF THE INVENTION

This invention pertains to a pipe end preparation machine supportable from the pipe and wherein the axial and radial feed rate of a tool can be remotely controlled to provide the capability for a number of different machining operations on a pipe, such as internal or external threading, facing, turning and contouring or profiling.

In the repair and replacement of equipment associated with pipe lines, it is frequently necessary to cut the pipe and, thereafter, prepare the end of the pipe, with the pipe end prep operations involving one or more of facing, turning, profiling, threading, or beveling, Equipment has existed for cutting the pipe and performing other operations on the pipe, such as beveling the end preparatory to making a weld connection to the pipe end. Machines presently in existence do not have the capability of continuously controlled axial and radial feed rates for a tool enabling the machine to provide additional operations, such as threading or profiling, nor have such machines had the capability of remote control whereby the machine may be used at a location where an operator cannot be at the machine, such as in an atomic energy facility.

SUMMARY OF THE INVENTION

A primary feature of the invention disclosed herein is to provide a machine for end preparation of a pipe or similar structure operable in situ on the pipe and wherein the cutting tool is operable in axial and radial feed movements under continuously controlled feed rates, in order to maximize the number of operations that can be performed by the machine.

Still another feature of the invention is to provide a pipe end preparation machine of the type defined in the preceding paragraph wherein the means for causing radial and axial feed of the tool include remotely controllable motors whereby, after set-up of the machine, the presence of an operator at the machine during the machining operations is not required and with the cutting operation being variable during a cycle of operation from a remote control location.

In carrying out the foregoing features of the invention, it is an object to provide an end preparation machine having a frame supportable in oriented relation from and beyond an end of a pipe, a tool head mounted on the frame for rotation about an axis coincident with the axis of the pipe, a tool slide mounted on the tool head for carrying a tool for movement in a radial feed path radial to said axis, means including an axial feed motor for advancing the frame toward the pipe end to provide axial feed of the tool and means for advancing the tool slide for radial feed of the tool, including a planetary gear drive having an output for moving the tool slide and a remotely controlled variable speed motor connected to the planetary gear drive whereby the speed of the motor establishes the radial feed rate of the tool.

Still another object of the invention is to provide a machine as defined in the preceding paragraph wherein the planetary gear drive includes a rotatable ring gear and means are associated with the motor and planetary gear drive for either holding the ring gear against rotation or permitting free rotation thereof to additionally establish either a fixed radial feed rate or to have no feed to the tool radially of the pipe.

A further object of the invention is to provide a pipe end preparation machine, as defined in the preceding paragraph, wherein the axial feed rate of the tool is accomplished by an axial feed motor for advancing the frame and with the axial feed motor as well as the variable speed motor providing for radial feed of the tool being remotely controllable for varying the radial and axial feed rates of the tool from a remote location.

Another object of the invention is to provide a pipe end preparation machine, as defined in the preceding paragraphs, wherein the machine frame is supported on a mounting mast which is secured to the pipe and rotatably mounts the frame and the axial feed rate structure includes an externally threaded member fixed to a section of the mast and a sleeve rotatable on the frame and threaded on the externally threaded member and operable by the axial feed motor for accomplishing axial feeding of the tool and with the externally threaded member being positionable at different locations on the mast section to control the distance from the pipe end in which the range of axial feed movement occurs.

BRIEF DESCRIPTION OF THE DRAWINGS

FIG. 2 is a central section on an enlarged scale, taken generally along the line 2—2 in FIG. 1; and FIG. 3 is a schematic view of components of the tool feed mechanism shown in association with a remote controller and showing a mandrel for mounting within a pipe.

DESCRIPTION OF THE PREFERRED EMBODIMENT

Figure 1:
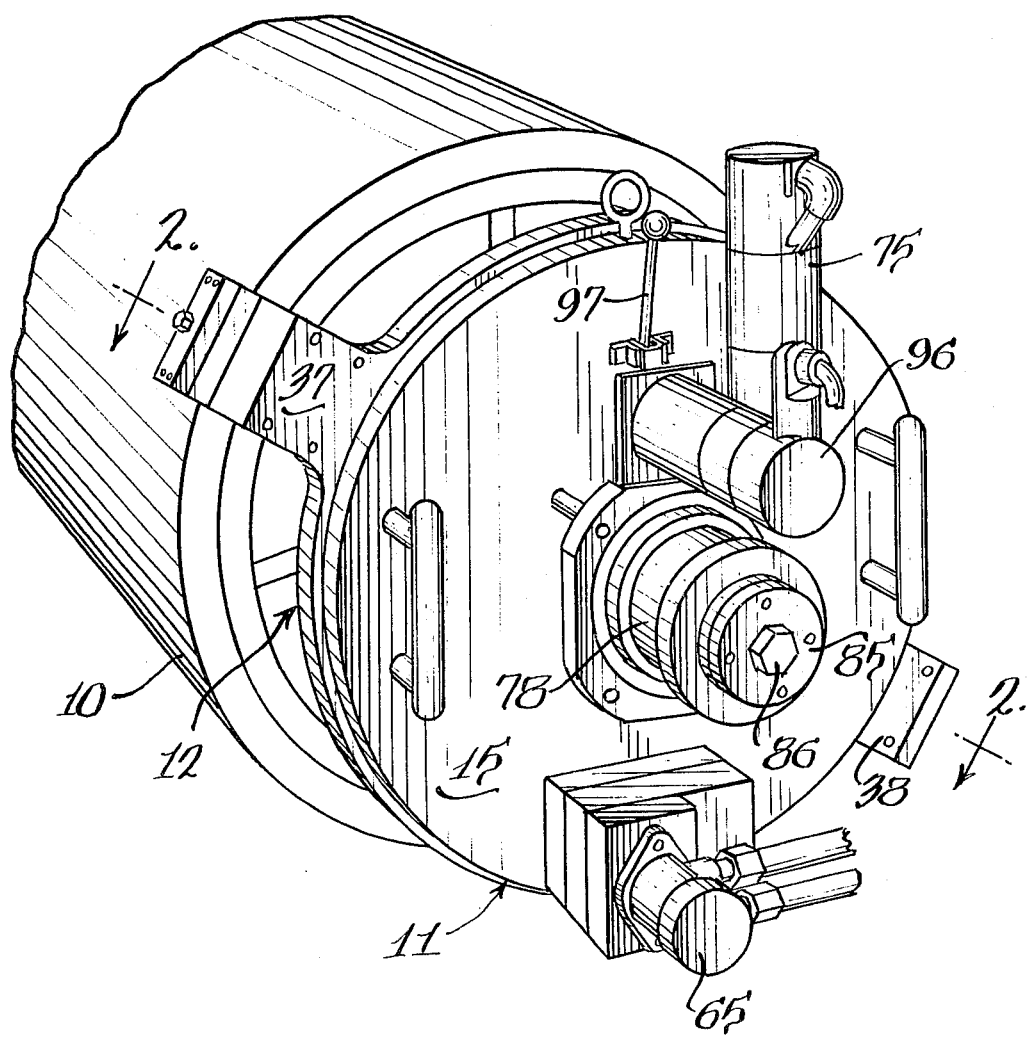
FIG. 1 is a perspective elevational view of the pipe end preparation machine, shown in association with a short section of pipe.

The pipe end preparation machine is shown generally in FIG. 1 as positioned for operation on a pipe end and with a length of pipe shown at 10. The machine has a frame, indicated generally at 11, which rotatably mounts a tool head, indicated generally at 12.

The frame 11 has a base plate 15 having a generally circular configuration and a central opening which receives a sleeve 16 and which is secured thereto by machine screws 17. The frame is mounted in oriented relation from and beyond an end of the pipe 10 by mounting on a mast 20 in the form of a generally cylindrical member which has a flange 21 at one end which attaches by threaded members 22 to a mandrel, indicated generally at 23 in FIG. 3. The mandrel may be of a conventional construction having a series of radially extendable baldes or vanes 24 which extend outwardly from a mandrel body 25 to tightly engage the inner wall of the pipe and rigidly locate the mast 20 relative to the pipe and with the axis of the mast being coincident with the longitudinal axis of the pipe.

The tool head 12 has a base plate 30 which is in spaced, parallel relation to the base plate 15 of the frame and is provided with a central opening to receive a sleeve 31 which surrounds the sleeve 16 of the frame and which is rotatably mounted thereon by roller bearings 32 and 33 and with the base plate 30 and sleeve 31 being secured together by machine screws 34.

The base plate 30 of the tool head has a pair of arms 37 and 38 extending outwardly from the base plate which mount a pair of tool guides 35 and 36. The tool guides 35 and 36 are mounted to their respective arms by machine screws 40. The tool guides 35 and 36 each mount a respective tool slide 41 and 42 with each being adapted to hold a tool, such as identified at 43 and 44, respectively. The tool slide 41 is movable along the tool guide 35 by rotation of a lead screw 45 in threaded relation with the tool slide and which is rotatably mounted at opposite ends of the tool guide by bearings 46 and 47 supported in structural members extending outwardly from the tool guide. Rotation of the lead screw 45 is in response to rotation of a drive gear 48 fixed to one end of a rotatable shaft 49 which is rotatably mounted in an opening in the tool head base plate 38 and which connects to a worm 50 meshing with a gear 51. (FIG. 3) on the lead screw 45.

Similarly, the tool slide 42 is moved by rotation of a lead screw 52 rotatably mounted at opposite ends by bearings 53 and 54 in structural members extending outwardly from the tool guide 36. Rotation of the lead screw causes radial movement of the tool slide by engagement of the lead screw with threaded members 56 and 57 mounted within an opening in the tool slide through which the lead screw extends. The lead screw 52 is rotated by rotation of a drive gear 58 fixed to a shaft rotatably mounted in the base plate 38 of the tool head and which connects to a worm 60 which meshes with a gear 61 fixed to an end of the lead screw 52.

In order to perform a cutting operation, the tool head 12 is rotated by means of a motor 65 which, for example, can be a Char-Lynn hydraulic motor having a connection to a shaft 66 mounting a gear 67 which meshes with a gear 68 on a shaft 69. The shaft 69 extends beyond a face of the base plate 15 of the frame 11 and has a gear 70 in the space between the last-mentioned base plate and the base plate 38 of the tool head 12. The gear 70 meshes with an annular, internally-toothed gear 71 fixed to the base plate of the tool head whereby with the frame 11 mounted on the mast 20 and held against rotation, the rotation imparted to the gear 70 by the motor 65 causes rotation of the tool head. The frame 11 may move axially of the mast 20 in order to provide for axial feed of the tools 43 and 44, but cannot rotate on the mast. This action is controlled by a keyed relation between the frame and mast and with the interior of the frame sleeve 16 having a key 72 engageable within a longitudinally-extending keyway formed in the surface of the mast 20.

The axial movement of the frame 11 and the tool head carried thereby is accomplished by operation of a remotely controllable motor 75 mounted on the frame and having its output shaft connected to a worm gear 76 which meshes with a gear 77 surrounding a sleeve 78 and affixed thereto. The sleeve 78 is rotatably mounted on and extends from an end of the frame sleeve 16 by means of a bearing 79. The sleeve 78 surrounds an end section 80 of reduced diameter of the mast 20 which mounts an externally-threaded nut 81 and a pair of spacers 82 and 83 and with the nut 81 being keyed to the section 80 of the mast by a key and keyway, indicated at 84. The sleeve 78 is internally threaded and in threaded engagement with the external thread on the fixed nut 81 whereby rotation of the sleeve 78 under control of the motor 75 causes either advance or retraction of the sleeve 78 and the frame 11 axially of the mast. The nut 81 and spacers 82 and 83 are held in position on the section 80 of the mast by positioning between a shoulder on the mast and a plate 85 which is held in position by a machine screw 86 which threads into the section 80 of the mast. If it is desired to vary the distance of the tool axial feed range with respect to the pipe end without relocating the mandrel 23, the relation between the nut 81 and the spacers 82 and 83 can be varied. For example, if the tools 43 and 44 are to operate closer to the pipe end, it is possible to locate the spacer 83 next to the spacer 82 and have the nut 81 abut against the shoulder on the mast which then provides for a range of axial feed which is closer to the pipe end.

As previously stated, the radial feed of the tools and the tool slides 41 and 42 is under the control of the drive imparted to the drive gears 48 and 58. These drive gears form part of a planetary gear drive which also includes an externally-toothed ring gear 90 which is rotatably mounted externally of the sleeve 31 of the tool head by means of a bearing 91 interposed therebetween. For ease of construction, the ring gear 90 is shown rotatably mounted on the tool head sleeve 31. However, it could be mounted rotatably on the frame 11. Each of the drive gears 48 and 58 meshes with the ring gear 90.

An additional element of the planetary gear drive is a gear 93 fixed to a gear shaft 94 which, through a disengageable clutch 95 is connected to a remotely controllable motor 96. The motor 96 is of a commercially available type, such as a DC motor, and has a brake incorporated therein whereby when the motor is deenergized the brake is effective to prevent rotation of the output shaft of the motor. The clutch 95 may be of a conventional type, such as a sprag clutch which is operable by a handle 97 to either connect the gear shaft 94 to the shaft of the motor or to release the connection therebetween. When the connection is released, the gear 93 and ring gear 90 are free to rotate.

With the planetary gear drive and associated structure, it is possible to have rotation of the tool head without any radial feed of the tools. This occurs when the clutch 95 is disengaged and the gear 93 is free to rotate. Under these conditions, the planetary ring gear 90 is free to rotate, whereby, as the tool head rotates, the gears 48 and 58, which are in mesh with the ring gear, are not rotated but merely cause the planetary ring gear to rotate as the gears 48 and 58 move with the rotating tool head. When the clutch 95 is engaged and the motor 96 is not energized, the gear 93 is held against rotation and, thus, the planetary ring gear 90 is also held against rotation. Under these conditions, when the tool head rotates, the gears 48 and 58, by their engagement with the ring gear, are caused to rotate with resulting rotation of the lead screws 45 and 52 to cause movement of the tool slides radially of the pipe. In an embodiment of the structure, the gear relations are such that there are four revolutions of the drive gears 48 and 58 for one revolution of the tool head, with resulting movement of the tools radially of the pipe. This provides a continuously controlled radial feed rate for the tools.

The radial feed rate is variable by control of the speed of the motor 96 with the clutch 95 engaged. The motor 96 imparts rotation to the gear 93 which causes rotation of the ring gear 90 to provide an added increment of rotation to the drive gears 48 and 58 beyond that occurring when the ring gear is held against rotation by the brake of the deenergized motor.

With the axial feed and radial feed of the tools being caused by motor-driven gear drives, the motors can be remotely controlled for determining the desired axial and radial feed rates. As shown in FIG. 3, this can be a control provided by a control console 100, such as a computer, which has output control lines 101, 102, and 103. The output control line 101 controls a flow-control valve 104 for controlling the rate of fluid flow to the hydraulic motor 65 and, thus, the rotation speed of the tool head 12. The output line 102 controls the axial feed motor 75 and, thus, controls the axial feed rate of the tools. The output line 103 extends to the radial feed motor 96 and, thus, controls either deenergization of, or the rate of speed of rotation of, the motor to provide two of the modes of operation of the tools in radial feed, as previously described. Although not shown with respect to all of the controlled motions, there are encoders, as known in the art, which can feed back to the control console 100 information as to the actual rates of movement to thus provide a feedback signal. Illustrative of one feedback signal is the encoder 105 having a gear 106 engaging the gear 71 which feeds back to the unit 100 the rotational speed of the motor-driven tool head 12. Additionally, a valve in a hydraulic circuit (not shown), including the flow-control valve 104 for the hydraulic motor 65, is a solenoid-operated on-off valve which can be remotely controlled for starting and stopping rotation of the tool head.

With the structure disclosed herein, it will be evident that the pipe end preparation machine can be mounted on a pipe and remotely controlled to provide tool movements which are any combination of axial and radial feed components whereby in addition to conventional bevelling of the pipe end preparatory to welding, it is possible to do internal or external threading on the pipe as well as profiling and contouring and other operations, such as facing and turning.

We claim:

1. A pipe end preparation machine comprising: a frame mounted on a mast positionable in oriented relation from and beyond an end of a pipe; a tool head, means mounting the tool head on said frame for rotation about an axis, means for rotating the tool head; a tool slide, means mounting the tool slide on said tool head for movement along a path radial to said axis to provide radial feed for a tool carried thereon; and drive mechanism for moving said tool slide radially including a rotatable gear carried by the tool head, a ring gear mounted rotatably relative to said tool head and meshing with said rotatable gear, and means including a variable speed motor with an output shaft which is braked when the motor is deenergized and a disengageable clutch operable to connect or disconnect the motor output shaft with a drive gear meshing with the ring gear operable to establish three different conditions of operation of the tool slide responsive to three different conditions of operation of the ring gear including a first condition wherein the clutch is disengaged and the ring gear is free to rotate with the tool head as caused by engagement of the rotatable gear with the ring gear and the tool slide does not move radially, a second condition wherein the clutch is engaged and the motor output shaft is braked to lock the ring gear against rotation and the rotatable gear is caused to rotate by rotation of the tool head relative to the ring gear and the tool slide moves radially, and a third condition wherein the clutch is engaged and the motor operating to rotate the ring gear and modify the rotation of the rotatable gear from that obtained in the second condition to obtain a different speed of radial movement of the tool head than that in the second condition.

2. A pipe end preparation machine comprising: a frame mounted on a mast positionable in oriented relation from and beyond an end of a pipe; a tool head, means mounting the tool head on said frame for rotation about an axis, means for rotating the tool head; a tool slide, means mounting the tool slide on said tool head for movement along a path radial to said axis to provide radial feed for a tool carried thereon; tool slide feed means including a rotatable gear carried by the tool head, a ring gear surrounding the frame and mounted rotatably relative to said tool head and meshing with said rotatable gear, a shaft rotatably mounted on said frame, a second gear on said shaft and engaging said ring gear, a variable speed drive motor having an output shaft, and a clutch for connecting or disconnecting said motor output shaft to said shaft mounting the second gear.

3. A pipe end preparation machine as defined in claim 2 including means for locking the ring gear against rotation whereby tool head rotation causes said rotatable gear to rotate on the ring gear and impart radial feed movement to the tool slide at a controlled rate.

4. A machine as defined in claim 2 including said mast engageable with a pipe and extendable from an end thereof, means mounting said frame on said mast for movement axially thereof, means for advancing said frame along the mast including a tubular member surrounding a section of said mast and rotatably mounted on said frame and having an internal thread, an externally threaded nut positionable at different positions along said mast section in mesh with said internal thread, means for locking said nut in a selected position and a drive connection from said axial feed motor to said tubular member.

5. A machine as defined in claim 4 wherein said locking means includes at least one spacer ring positionable at either side of said nut.

* * * * *